(12) United States Patent
Baldemair et al.

(10) Patent No.: US 11,201,718 B2
(45) Date of Patent: Dec. 14, 2021

(54) NUMEROLOGY INDICATION FOR RADIO ACCESS NETWORKS

(71) Applicant: Telefonaktiebolaget LM Ericsson (publ), Stockholm (SE)

(72) Inventors: Robert Baldemair, Solna (SE); Erik Dahlman, Stockholm (SE); Asbjörn Grövlen, Stockholm (SE); Stefan Parkvall, Bromma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/765,358

(22) PCT Filed: Nov. 28, 2017

(86) PCT No.: PCT/SE2017/051186
§ 371 (c)(1),
(2) Date: May 19, 2020

(87) PCT Pub. No.: WO2019/108099
PCT Pub. Date: Jun. 6, 2019

(65) Prior Publication Data
US 2020/0358584 A1    Nov. 12, 2020

(51) Int. Cl.
*H04L 5/00* (2006.01)
*H04L 27/26* (2006.01)

(52) U.S. Cl.
CPC .......... *H04L 5/0098* (2013.01); *H04L 5/0094* (2013.01); *H04L 27/2602* (2013.01)

(58) Field of Classification Search
CPC ............. H04W 80/02; H04W 72/0413; H04W 56/005; H04W 72/0446; H04W 72/0453; H04L 47/72; H04L 5/0048; H04L 5/0098; H04L 27/2602; H04L 5/0094
See application file for complete search history.

(56) References Cited

U.S. PATENT DOCUMENTS

| 9,820,281 B1 | 11/2017 | Werner et al. |
| 2009/0219802 A1* | 9/2009 | Han .................... H04J 11/0073 370/210 |

FOREIGN PATENT DOCUMENTS

WO    2017156224 A1    9/2017

OTHER PUBLICATIONS

International Search Report and Written Opinion dated Aug. 14, 2018 for International Application No. PCT/SE2017/051186 filed on Nov. 28, 2017, consisting of 9-pages.
(Continued)

*Primary Examiner* — Phuoc H Doan
(74) *Attorney, Agent, or Firm* — Christopher & Weisberg, P.A.

(57) ABSTRACT

There is disclosed a method of operating a network node in a radio access network. The method includes transmitting first numerology information indicating a first numerology for a carrier, the first numerology having a first subcarrier spacing and a first frequency reference. The method also includes transmitting a frequency shift indication indicating a second frequency reference for a second numerology for the same carrier, the frequency shift indication indicating the second frequency reference in relation to the first frequency reference. The disclosure also pertains to related methods and devices.

18 Claims, 5 Drawing Sheets

(56) References Cited

OTHER PUBLICATIONS

3GPP TSG RAN WG1 Meeting #90 RI-1714159; Title: On frequency-domain resource allocation for NR; Agenda Item: 6.1.3.3.1.1; Source: InterDigital, Inc.; Document for: Discussion, Decision; Location and Date: Prague, Czech Republic, Aug. 21-25, 2017, consisting of 5-pages.

* cited by examiner

US 11,201,718 B2

NUMEROLOGY INDICATION FOR RADIO ACCESS NETWORKS

CROSS-REFERENCE TO RELATED APPLICATIONS

This application is a Submission Under 35 U.S.C. § 371 for U.S. National Stage Patent Application of International Application Number: PCT/SE2017/051186, filed Nov. 28, 2017 entitled "NUMEROLOGY INDICATION FOR RADIO ACCESS NETWORKS," the entirety of which is incorporated herein by reference.

TECHNICAL FIELD

This disclosure pertains to wireless or telecommunication communication technology, in particular to radio access technology, e.g. for mobile communication.

BACKGROUND

Currently, radio telecommunication technology of 5th Generation is being developed, with the goal to serve a large variety of use cases. The support of multiple numerologies on a carrier has been introduced for improved flexibility, but which requires new approaches for handling the system, in particular to limit signaling overhead.

SUMMARY

It is an object of this disclosure to provide approaches allowing efficient signaling in the context of multiple numerologies, in particular for setting up a communication link between a user equipment (UE) and the network. The approaches are particularly advantageously implemented in a $5^{th}$ Generation (5G) telecommunication network or 5G radio access technology or network (RAT/RAN), in particular according to 3GPP (3rd Generation Partnership Project, a standardisation organization). A suitable RAN may in particular be a RAN according to NR, for example release 15 or later, or LTE Evolution.

There may generally be considered a method of operating a network node in a radio access network, the method comprising transmitting first numerology information indicating a first numerology for a carrier. The first numerology may have a first subcarrier spacing and a first frequency reference. The method comprises transmitting a frequency shift indication indicating a second frequency reference for a second numerology for the same carrier, the frequency shift indication indicating the second frequency reference in relation to the first frequency reference.

Moreover, there is described a network node and/or network node arrangement in a radio access network. The network node and/or network node arrangement is adapted or configured for transmitting first numerology information indicating a first numerology for a carrier, the first numerology having a first subcarrier spacing and a first frequency reference, wherein the network node and/or arrangement further is adapted or configured for transmitting a frequency shift indication indicating a second frequency reference for a second numerology for the same carrier, the frequency shift indication indicating the second frequency reference in relation to the first frequency reference. The network node or arrangement may comprise, and/or be adapted or configured for utilising, processing circuitry and/or radio circuitry, in particular a transmitter and/or transceiver and/or receiver, for transmitting the information and/or indication, and/or may comprise a corresponding transmitting module.

Transmitting the information and/or frequency shift indication may comprise, and/or be based on, receiving an indication from a user equipment, e.g. indicating the first numerology as determined numerology, and/or requesting the frequency shift indication. A network node or network node arrangement may be adapted and/or configured to operate on a carrier using the first and the second numerologies, and optionally one or more additional numerologies. Generally, a network node or node arrangement may be adapted or configured for a set of numerologies for a carrier. One or more of the numerologies may be configured for a UE by the network node or node arrangement. It should be noted that a network node may operate with more numerologies than any individual UE it communicates with.

There is also disclosed a method of operating a user equipment in a radio access network. The method comprises determining a first subcarrier spacing and a first frequency reference for a first numerology for a carrier based on first numerology information, and determining a second frequency reference for a second numerology for the same carrier based on a received frequency shift indication, the frequency shift indication indicating the second frequency reference in relation to the first frequency reference. The method may optionally comprise communication on the carrier based on the first and/or second numerology.

A user equipment for a radio access network may be considered. The user equipment is adapted for determining a first subcarrier spacing and a first frequency reference for a first numerology for a carrier based on numerology information, and for determining a second frequency reference for a second numerology for the same carrier based on a received frequency shift indication, the frequency shift indication indicating the second frequency reference in relation to the first frequency reference. Optionally, the UE may be adapted or configured for communication, and/or for being configured for communication, on the carrier based on the first and/or second numerology. It may be considered that the UE comprises, and/or is adapted for utilising, processing circuitry and/or radio circuitry, in particular a transmitter and/or receiver and/or transceiver, for determining the spacing and/or frequency references, and/or for receiving the frequency shift indication.

Determining the second frequency reference may comprise, and/or be based on, determining a maximum PRB of the second numerology and/or a maximum frequency, e.g. maximum subcarrier center frequency, and/or a numerology bandwidth of the second numerology, and/or a subcarrier spacing of the second numerology, which may be referred to a second subcarrier spacing. Determining the maximum PRB and/or maximum subcarrier center frequency may be based on a (second) frequency shift indication, which may be separate or identical or combined to the frequency shift indication. Alternatively, or additionally, it may be determined based on a range indication, which may indicate a bandwidth or range or total number of PRBs. Any corresponding information or indication may be provided with one or more transmissions by the network node and/or node arrangement.

Determining the first subcarrier spacing and/or the first reference indication and/or the first numerology information may be performed when acquiring a carrier and/or cell, and/or before performing random access, in particular an initial random access.

Generally, a frequency reference may indicate a border in frequency of an associated numerology bandwidth. A frequency reference may indicate a center frequency of a 100 subcarrier, e.g. of a lowest subcarrier (in frequency) of a resource block, like a physical resource block (PRB). The second frequency reference may be determined based on the shift such that it coincides with a center frequency of a subcarrier of the first numerology, e.g. a lowest subcarrier of a physical resource block. The lowest subcarrier may be associated to a lowest PRB (in frequency), e.g. PRB0, of the numerology with the larger subcarrier spacing, if applicable. The first frequency reference may indicate the lowest (e.g., subcarrier center) frequency and/or subcarrier and/or PRB of the first numerology. The second frequency reference may indicate the lowest (e.g., subcarrier center) frequency and/or subcarrier and/or PRB of the second numerology.

The first numerology information may indicate the first subcarrier spacing and the first frequency reference, and in some cases, may indicate the numerology bandwidth of the first numerology, and/or an end in frequency. The first numerology information may be transmitted and/or signaled and/or indicated in one or more transmissions and/or signalings and/or messages, which may be on the same or different channels or signaling blocks, e.g. SS blocks. The information may be broadcast and/or unicast and/or groupcast.

The first frequency reference may pertain to, e.g. indicate and/or refer to, a first subcarrier in a first physical resource block, the first subcarrier having the lowest frequency of the subcarriers in the first physical resource block, and/or the second frequency reference may pertain to, e.g. indicate and/or refer to, a second subcarrier in a second physical resource block, the second subcarrier having the lowest frequency of the subcarriers in the second physical resource block.

In some cases, the first and second numerology may have different subcarrier spacings. However, cases with the same spacing may be considered.

It may be considered that the frequency shift indication may indicate a shift in frequency between a physical resource block and/or subcarrier according to the second numerology and a physical resource block and/or subcarrier according to the first numerology, in particular of a center frequency of the subcarriers. The shift may represent different starts in frequency for the numerology bandwidths of the first and second numerology.

The frequency shift indication may be represented by a bit field, which in particular may be a field of n bits, in particular 1 or 2 or 3 bits. Accordingly, steps of 2^n bits may be indicated. Each shift may refer to a shift step size, e.g. in a suitable unit, e.g. Hz or PRB or subcarrier spacing, or multitudes thereof. The bit field may be 140 interpreted or mapped (e.g., predefined or configured or configurable) to a range of values that may be positive, or negative, or may range from negative to positive values.

The frequency shift indication may indicate a shift of the second frequency reference to higher frequencies if the second numerology has a larger subcarrier spacing than the first numerology, and/or the frequency shift indication may indicate a shift of the second frequency reference to lower frequencies if the second numerology has a smaller subcarrier spacing than the first numerology. This allows optimized use of the carrier bandwidth, in particular if the numerology with the smallest subcarrier spacing, and/or the lowest frequency and/or subcarrier center frequency, is close to the carrier border. A shift of zero may be indicated in either case, e.g. depending on guard intervals between the numerology bandwidth and the border of the carrier bandwidth.

Generally, the structure of the first and second numerology at the lower frequency 155 end may be mirrored at the higher end, or a different frequency shift may be used, in particular such that the numerology with the larger subcarrier spacing has a larger frequency distance to the higher frequency border of the carrier. Thus, the numerology grids may be symmetrical, or asymmetrical in respect to the center carrier frequency.

The frequency shift indication may be interpreted to indicate a positive or negative shift between the first frequency reference and the second frequency reference based on a difference between the first subcarrier spacing and a second subcarrier spacing of the second numerology. Generally, based on a difference between first subcarrier spacing and second subcarrier spacing, a frequency shift may be in different directions, e.g. to higher or lower frequencies, e.g. according to a sign of the shift. A difference may be represented by a ratio, or an arithmetic difference. For equal spacings, a shift may be in either direction, e.g. predefined and/or indicated with a reserved bit combination for the frequency shift indication or a subpattern thereof. For a given difference in spacings, a fixed sign may be assumed, e.g. positive (and/or to higher frequencies) if the first subcarrier spacing is smaller (or equal, depending on convention) than the second, otherwise negative.

In some variants, the frequency shift indication may indicate a shift in units pertaining to the smaller of the subcarrier spacings. and/or wherein the frequency shift indication may indicate a shift in units pertaining to the smallest subcarrier spacing defined for a frequency band or frequency region or carrier. The shift may be indicated as integer number of such units (e.g., positive or negative or zero). The unit may in particular be in units of PRBs. In some cases, the unit may be represented in Hz and/or may be scaled to a PRB size of a numerology with larger subcarrier spacing.

The first numerology and/or first subcarrier spacing may be associated to signaling of RMSI, e.g. on a PDSCH or other channel. It may be determined based on system information, e.g. SS block and/or PBCH information, and/or other broadcast signaling, and/or based on reception of the signaling comprising the RMSI and/or scheduling or indicating it. The first frequency reference may be indicated with the RMSI. Determining the first numerology information generally may be implicit and/or explicit.

It may be considered that the frequency shift indication is transmitted separately from first numerology information. For example, the indication may be provided with DCI, e.g. on a PDCCH, or a group PDCCH, and/or groupcast or singlecast to a UE, e.g. based on signaling transmitted by the UE. In other variants, it may be combined with first numerology information, in particular with RMSI.

It may be considered that the frequency shift indication may indicate a plurality of shifts between frequency references associated to different subcarrier spacings, each shift pertaining to neighbouring subcarrier spacings. A shift pertaining to neighboring subcarrier spacings may indicate a relative shift between two numerologies with spacings closest to each other in a set of spacings configured and/or allowable. Thus, different layers of shifts may be indicated, e.g. with the same or different transmissions or messages. However, in some variants, for each numerology and/or subcarrier spacing, a shift relative to a first numerology may be indicated. This may in some cases require differently sized fields for indicating the shift, e.g. larger fields (in bit size) for larger differences in subcarrier spacing.

There is also disclosed a program product comprising instructions adapted for causing processing circuitry to control and/or perform a method as described herein.

Moreover, a carrier medium arrangement carrying and/or storing a program product as disclosed herein may be considered.

According to approaches described herein, reliable and efficient signaling in particular of the beginning/lower frequency border of a numerology bandwidth within a carrier bandwidth may be provided, based on a frequency shift relative to a determined or detected first numerology, respectively an associated lower end and/or subcarrier spacing. Analogue approaches may be used to signal an upper end in frequency, either in combination or instead. It may be considered that with indicating on of the ends/border in frequency for a numerology as described herein, and indicating a bandwidth or frequency range or total number or PRBs, the numerology bandwidth is sufficiently identified to a UE. The approaches in particular allow use of small bitfields, in particular in variants in which a numerology with smaller subcarrier spacing may be closer in frequency to one or both of the carrier bandwidth borders than a numerology with larger subcarrier spacing, to ensure guard intervals are observed. Thus, depending on the difference between the spacings, the bit field may uniquely be interpreted to represent a shift in only one direction. Thus, efficient use of available frequency bandwidth and efficient signaling may be facilitated. It may generally be considered that the numerology bandwidths of the first and second numerology are aligned based on subcarrier center frequencies of lowest frequency subcarriers, e.g. such that the center frequency of the lowest subcarrier of the lowest PRB of the numerology with the larger subcarrier spacing coincides with the subcarrier center frequency of the lowest subcarrier of a PRB of the numerology with the smaller subcarrier spacing, e.g. according to the frequency shift indication.

A network node arrangement may comprise one or more radio nodes, in particular network nodes, which may be of the same or different types. Different nodes of the arrangement may be adapted for, and/or provide, different functionalities described herein. A network node arrangement may in some variants represent a radio access network, and/or a heterogenous network (HetNet), and/or provide dual (or multiple) connectivity, e.g. comprising an anchor node and a booster node, and/or one or more of each or either. The radio nodes of a node arrangement may comprise suitable interfaces for communication between them, e.g. communication interfaces and/or corresponding circuitry.

A system comprising a plurality of radio nodes as described herein, in particular a network node and one or more user equipments may be considered.

Signaling or a transmission may be considered to carry a message and/or information, if the message and/or information is represented in the (modulated) waveform of the signaling. In particular, extraction of a message and/or information may require demodulation and/or decoding of the signaling. Information may be considered to be included in a message if the message comprises a value and/or parameter and/or bit field and/or indication or indicator representing the information, or more than one or a combination thereof. Information included in such a message may be considered to be carried by the signaling carrying the message, and vice versa. A signaling characteristic, however, may pertain to a characteristic accessible without demodulation and/or decoding, and/or may be determined or determinable independent thereof. However, in some cases it may be considered that signaling is demodulated and/or decoded to determine whether the characteristic is associated to specific signaling, e.g. if the resources characterising the signaling actually belong to control signaling and/or to signaling intended for the responding radio node or user equipment. Also, in some cases, the characteristic may be provided as information in a message, in particular if the characterising signaling is not carrying the selection control message. Generally, selection of the resource structure may be based on one or more than one signaling characteristics. A signaling characteristic may in particular represent one or more resources, in particular in time domain, e.g. beginning and/or end and/or duration of the signaling, e.g., represented in symbol/s, and/or frequency range or resources of the signaling, e.g. represented in subcarrier/s, and/or numerology of the signaling, in particular of control signaling or data signaling like PDSCH signaling or PSSCH signaling. In some cases, the characteristic may indicate a message format, e.g. a format of the selection control message, for example an associated DCI or SCI format. It may generally be considered that a signaling characteristic represents and/or indicates a DCI format and/or search space (e.g., reception pool) and/or code, e.g. scrambling code, and/or an identity, e.g. one of different identities (like R-NTI or C-NTIs) assigned to the responding radio node or user equipment. Control signaling may be scrambled based on such identity.

BRIEF DESCRIPTION OF THE DRAWINGS

The drawings are provided to illustrate concepts and approaches described herein, and are not intended to limit their scope. The drawings comprise.

DETAILED DESCRIPTION

Figure 1:
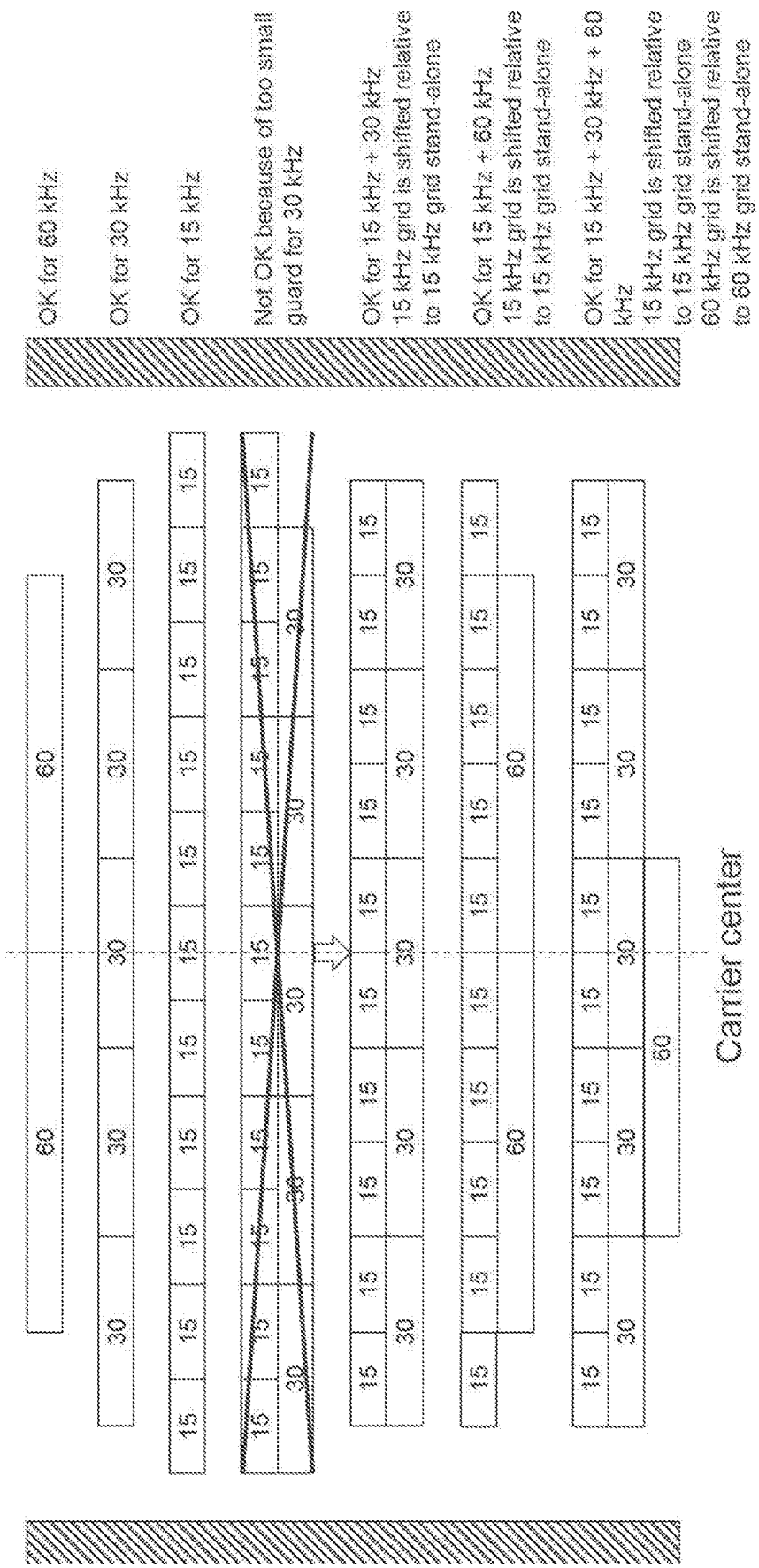
FIG. 1, showing possible numerologies for a carrier.

In the following, approaches are described for illustrative purposes in the context of NR RAT. However, they are generally applicable with other technologies. Also, communication in uplink and downlink between a signaling radio node like a network node and a radio node like an UE is described by way of example. The approaches should not be construed to be limited to such communication, but can also be applied for sidelink or backhaul or relay communication. For ease of reference, in some cases it is referred to a channel to represent signaling or transmission on the channel. A PUSCH may represent uplink data signaling, a PDSCH downlink data signaling, a PDCCH downlink control signaling (in particular, one or more DCI messages like scheduling assignments or grants), a PUCCH uplink control signaling, in particular signaling of UCI. In some cases, UCI may be transmitted on PUSCH or associated resource instead of on PUCCH. A PBCH is an example of a broadcast channel, a SS block may represent system information signaling, in particular synchronisation signaling. A SS block may be transmitted together with PBCH.

Radio nodes in a radio access network may use one or more carriers for radio communication. A carrier may have an extension in frequency space with a carrier bandwidth, and may comprise a reference frequency within the bandwidth; carriers are often identified by the reference frequency (which may be a center or central frequency). For each carrier, the network (in particular a gNodeB or other network) may configure or select one or more numerologies. A numerology may be considered to impose a structure or grid on time and/or frequency resources used with the carrier. It may be considered that a numerology defines a subcarrier spacing and/or (numerology) bandwidth and/or frequency reference. In particular, a subcarrier spacing may define the width of subcarriers in frequency (subcarrier bandwidth), which also influences the symbol time length of the numerology and the size of resource elements. The numerology bandwidth may identify the part of the carrier bandwidth available when using the numerology. Subcarriers may be combined into subcarrier groups, in particular a resource block like a physical resource block (PRB), which may comprise e.g. 12 subcarriers. In some variants, the number of subcarriers in a physical resource block may be the same for each numerology and/or carrier, or in some cases different. Such a resource block may indicate a sub-bandwidth of the carrier. In some variants, a PRB may be smallest addressable or schedulable frequency resource unit. For a carrier, a set of subcarrier spacings may be available, e.g. of 15 kHz×2^n, with n being 0 or an integer, or a subset thereof, which may be limited, e.g. depending on carrier frequency. In some cases, the values for n may be dependent on carrier frequency (or upper frequency), e.g. whether it is below a threshold like 6 GHz or above.

For communication, usually not the full bandwidth of the carrier is used, but at the frequency borders there are guard intervals, to limit interference between carriers. As subcarriers may generally be used for carrying signaling, which will not be limited to a subcarrier, but also extend to the sides of it (in frequency) due to sidelobes. Relatively strong sidelobes occur at the scale of a subcarrier spacing, thus the subcarrier spacing also influences the sidelobe distribution and may be considered when contemplating guard intervals. In particular, the guard intervals for larger subcarrier spacings may be chosen to be larger than those for smaller subcarrier spacings. Accordingly, the borders of different numerology bandwidths in the carrier bandwidth may be different, in particular to allow maximum use of the carrier bandwidth. Generally, the numerology bandwidth may extend from a lowest PRB to a highest PRB (each PRB as defined for the numerology), which may be numbered, e.g. from 0 to L, with L being the number of the highest, e.g. with increasing frequency. The subcarrier in one block like a PRB may be indexed from the lowest to the highest in frequency, e.g. from 0 to M, e.g. 0 to 11, or 1 to 12 (with M being the number of subcarriers in a block). To each subcarrier, there may be assigned a (subcarrier) center frequency, which may be in the center/middle of the subcarrier bandwidth.

FIG. 1 shows some variants of different numerologies with subcarrier spacings of 15 kHz, 30 kHz and 60 kHz (as examples). The carrier frequency (center frequency) is indicated, as well as the frequency borders in the patterned regions. Frequency extends along the x-axis. The numbers in the fields represent PRBs with subcarrier spacings corresponding to the number indicated in kHz. The space between the borders of the carrier bandwidth and the numerology grids may be considered to represent guard intervals. Possible combinations of numerologies are arranged directly beneath each other. It may be assumed that the leftmost PRB of a 15 kHz PRB indicates the closest possible arrangement of a 15 kHz numerology bandwidth to a lower carrier bandwidth border still allowing a suitable guard interval for this subcarrier spacing; a similar assumption may be considered on the right side. Accordingly, the struck-out combination of 30 kHz numerology and 15 kHz numerology may not be available, as the guard interval for the 30 kHz is not large enough to fulfil requirements. The other shown combination may be feasible. Thus, there may be a wide range of numerologies acceptable, with different starting points in frequency within the carrier bandwidth, while some combinations may not be acceptable. It can be concerned from FIG. 1, that each numerology has an associated numerology bandwidth within the carrier bandwidth, and provides a grid or structure on the numerology bandwidth defined by the PRBs with the associated subcarrier spacing. The frequency resources of the numerology may be addressed by reference to the PRBs.

Figure 2:
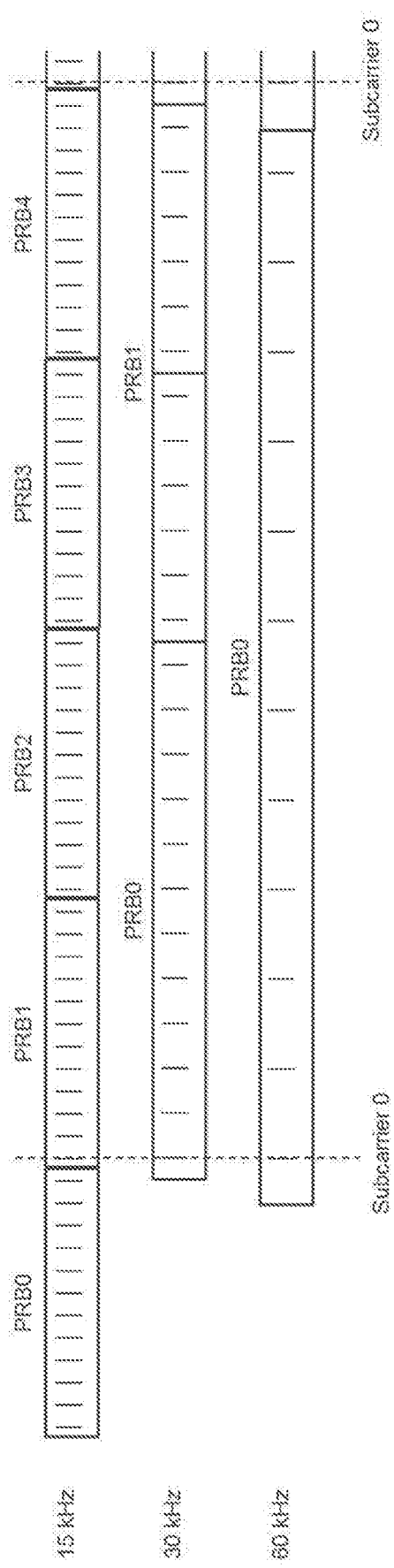
FIG. 2, showing possible alignments of numerologies.

The grids of numerologies for the same carrier may be aligned, e.g. such that a subcarrier center frequency (sometimes referred to as central frequency) of a lowest subcarrier (e.g., subcarrier 0 and/or lowest in frequency) in a PRB (in particular, the lowest or first PRB in frequency) of a numerology with larger subcarrier spacing coincides with the center frequency of a lowest subcarrier in a PRB of a numerology with smaller subcarrier spacing. This may be implemented for all numerologies with smaller subcarrier spacing that are allowable and/or configured for the carrier. FIG. 2 shows exemplarily how the grids for numerologies with 3 different subcarrier spacings may be alignment. The numerologies are sorted from top to bottom with increasing subcarrier spacing, and may for example represent spacings of 15 kHz, 30 kHz and 60 kHz. Different PRBs with low numbers (from 0 up, 0 representing the PRB with the lowest frequency for each carrier) are shown, wherein within each PRB, there are subcarriers (12), whose center frequency is indicated with a line. As shown, the center frequency of subcarrier 0 of PRB 0 of the numerology with the largest spacing coincides and is aligned with the center frequency of subcarrier 0 of PRB 0 the next-lower spacing, and also coincides with the center frequency of subcarrier 0 of PRB 1 of the numerology with the smallest spacing.

Figure 3:
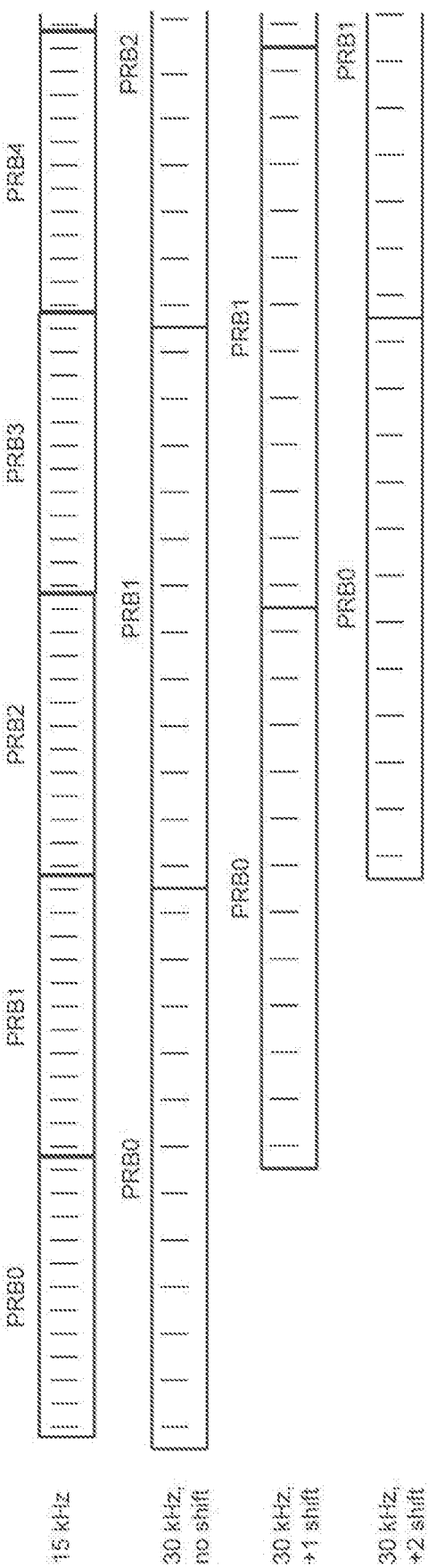
FIG. 3, showing possible shifts between frequency grids for numerologies.

If a UE wants to join a radio access network, it may scan one or more carriers for 395 system information, which may be transmitted in signaling, in particular SS Block/PBCH signaling. Based on such signaling, it may determine a subcarrier spacing for a (first) numerology, e.g. the subcarrier spacing used for signaling of RMSI (Remaining Minimum System Information), which may be provided, e.g. on a PDSCH, as indicated or scheduled with SS block signaling and/or control signaling. The RMSI, or other control information, may indicate the lowest PRB and/or its subcarrier 0, for the (first) numerology, and/or the numerology bandwidth and/or largest or maximum PRB. If one or more other numerologies are configured for the carrier or allowable, their subcarrier spacing and/or bandwidth and/or location of lowest PRB/lowest subcarrier of the lowest PRB) may be indicated relative to the first numerology. In particular, a frequency shift indication may be used, which may indicate a shift in frequency of the lowest subcarrier and/or PRB of the second numerology relative to the frequency location of the lowest PRB/lowest subcarrier of the first numerology. If the first numerology has a smaller subcarrier spacing than the second numerology, the frequency shift may be to higher frequencies, e.g. to the right as shown in FIG. 3. Otherwise, it may be to lower frequencies, e.g. to the left in FIG. 3. The shift may be indicated in units of PRBs, in particular of the numerology with the smaller subcarrier spacing, or of the numerology with the smallest allowable subcarrier spacing, e.g. 15 kHz. With such a frequency shift indication, the signaling overhead to indicate different numerologies may be limited. The frequency shift indication may be transmitted together with other control signaling, e.g. SS Block and/or PBCH signaling, or separately. It may be broadcast, or single- or multicast. For example, it may be transmitted with RMSI, or in a different control information message, e.g. on a PDCCH, and/or with a random access response, e.g. a Random Access message 2 or 4. The frequency shift indication may be transmitted by the network (e.g., a network node) in response to a transmission of the UE, which may indicate that and/or which numerology and/or subcarrier spacing the UE has determined to be the first numerology, and/or which may request the shift for a second numerology and/or associated (second) subcarrier spacing. FIG. 3 shows exemplary shifts between a first PRB of a numerology with subcarrier spacing with 15 kHz and a first PRB of a second numerology with a subcarrier spacing with 30 kHz (as examples). If the PRB0 of the first numerology is distant enough from the lower end of the carrier bandwidth, no frequency shift may be between the numerologies, such that the frequency shift indication may be 0. In other examples, the shifts may be 1 or 2, e.g. measured in PRB size of the first numerology. It should be noted that starting from one of the other numerologies in the figure, with 30 kHz spacing, the shifts may be inverse, e.g. negative.

Generally, PRBs may be considered to coincide if the center frequencies of their lowest subcarriers coincide.

Figure 4:
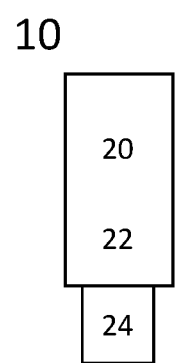
FIG. 4, showing an exemplary radio node implemented as a user equipment.

FIG. 4 schematically shows a radio node, in particular a terminal or wireless device 10, which may in particular be implemented as a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication. Radio node 10 may generally be adapted to carry out any of the methods of operating a radio node like terminal or UE disclosed herein; in particular, it may comprise corresponding circuitry, e.g. processing circuitry, and/or modules.

Figure 5:
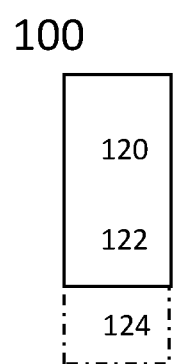
FIG. 5, showing an exemplary radio node implemented as a network node.

FIG. 5 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein; in particular, it may comprise corresponding circuitry, e.g. processing circuitry, and/or modules. The radio node 100 may generally comprise communication circuitry, e.g. for communication with another network node, like a radio node, and/or with a core network and/or an internet or local net, in particular with an information system, which may provide information and/or data to be transmitted to a user equipment.

References to specific resource structures like transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are transmission time interval (TTI), subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4 symbols. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology. The timing of a mini-slot may generally be configured or configurable, in particular by the network and/or a network node. The timing may be configurable to start and/or end at any symbol of the transmission timing structure, in particular one or more slots.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A system comprising one or more radio nodes as described herein, in particular a network node and a user equipment, is described. The system may be a wireless communication system, and/or provide and/or represent a radio access network.

Moreover, there may be generally considered a method of operating an information system, the method comprising providing information. Alternatively, or additionally, an information system adapted for providing information may be considered. Providing information may comprise providing information for, and/or to, a target system, which may comprise and/or be implemented as radio access network and/or a radio node, in particular a network node or user equipment or terminal. Providing information may comprise transferring and/or streaming and/or sending and/or passing on the information, and/or offering the information for such and/or for download, and/or triggering such providing, e.g. by triggering a different system or node to stream and/or transfer and/or send and/or pass on the information. The information system may comprise, and/or be connected or connectable to, a target, for example via one or more intermediate systems, e.g. a core network and/or internet and/or private or local network. Information may be provided utilising and/or via such intermediate system/s. Providing information may be for radio transmission and/or for transmission via an air interface and/or utilising a RAN or radio node as described herein. Connecting the information system to a target, and/or providing information, may be based on a target indication, and/or adaptive to a target indication. A target indication may indicate the target, and/or one or more parameters of transmission pertaining to the target and/or the paths or connections over which the information is provided to the target. Such parameter/s may in particular pertain to the air interface and/or radio access network and/or radio node and/or network node. Example parameters may indicate for example type and/or nature of the target, and/or transmission capacity (e.g., data rate) and/or latency and/or reliability and/or cost, and/or indicate quality of service and/or latency and/or data throughput and/or prioritisation, in particular they may indicate a capability to provide such, respectively one or more estimates thereof. The target indication may be provided by the target, or determined by the information system, e.g. based on information received from the target and/or historical information, and/or be provided by a user, for example a user operating the target or a device in communication with the target, e.g. via the RAN and/or air interface. For example, a user may indicate on a user equipment communicating with the information system that information is to be provided via a RAN, e.g. by selecting from a selection provided by the information system, for example on a user application or user interface, which may be a web interface. An information system may comprise one or more information nodes. An information node may generally comprise processing circuitry and/or communication circuitry. In particular, an information system and/or an information node may be implemented as a computer and/or a computer arrangement, e.g. a host computer or host computer arrangement and/or server or server arrangement. In some variants, an interaction server (e.g., web server) of the information system may provide a user interface, and based on user input may trigger transmitting and/or streaming information provision to the user (and/or the target) from another server, which may be connected or connectable to the interaction server and/or be part of the information system or be connected or connectable thereto. The information may be any kind of data, in particular data intended for a user of for use at a terminal, e.g. video data and/or audio data and/or location data and/or interactive data and/or game-related data and/or environmental data and/or technical data and/or traffic data and/or vehicular data and/or circumstantial data and/or operational data. The information provided by the information system may be mapped to, and/or mappable to, and/or be intended for mapping to, communication or data signaling and/or one or more data channels as described herein (which may be signaling or channel/s of an air interface and/or used within a RAN and/or for radio transmission). It may be considered that the information is formatted based on the target indication and/or target, e.g. regarding data amount and/or data rate and/or data structure and/or timing, which in particular may be pertaining to a mapping to communication or data signaling and/or one or more data channel/s. Mapping information to data signaling and/or data channel/s may be considered to refer to using the signaling/channel/s to carry the data, e.g. on higher layers of communication, with the signaling/channel/s underlying the transmission. A target indication generally may comprise different components, which may have different sources, and/or which may indicate different characteristics of the target and/or communication path/s thereto. A format of information may be specifically selected, e.g. from a set of different formats, for information to be transmitted on an air interface and/or by a RAN as described herein. This may be particularly pertinent since an air interface may be limited in terms of capacity and/or of predictability, and/or potentially be cost sensitive. The format may be selected to be adapted to the transmission indication, which may in particular indicate that a RAN or radio node as described herein is in the path (which may be the indicated and/or planned and/or expected path) of information between the target and the information system. A (communication) path of information may represent the interface/s (e.g., air and/or cable interfaces) and/or the intermediate system/s (if any), between the information system and/or the node providing or transferring the information, and the target, over which the information is, or is to be, passed on. A path may be (at least partly) undetermined when a target indication is provided, and/or the information is provided/transferred by the information system, e.g. if an internet is involved, which may comprise multiple, dynamically chosen paths. Information and/or a format used for information may be packet-based, and/or be mapped, and/or be mappable and/or be intended for mapping, to packets. Alternatively, or additionally, there may be considered a method for operating a target device comprising providing a target indicating to an information system. More alternatively, or additionally, a target device may be considered, the target device being adapted for providing a target indication to an information system. In another approach, there may be considered a target indication tool adapted for, and/or comprising an indication module for, providing a target indication to an information system. The target device may generally be a target as described above. A target indication tool may comprise, and/or be implemented as, software and/or application or app, and/or web interface or user interface, and/or may comprise one or more modules for implementing actions performed and/or controlled by the tool. The tool and/or target device may be adapted for, and/or the method may comprise, receiving a user input, based on which a target indicating may be determined and/or provided. Alternatively, or additionally, the tool and/or target device may be adapted for, and/or the method may comprise, receiving information and/or communication signaling carrying information, and/or operating on, and/or presenting (e.g., on a screen and/or as audio or as other form of indication), information. The information may be based on received information and/or communication signaling carrying information. Presenting information may comprise processing received information, e.g. decoding and/or transforming, in particular between different formats, and/or for hardware used for presenting. Operating on information may be independent of or without presenting, and/or proceed or succeed presenting, and/or may be without user interaction or even user reception, for example for automatic processes, or target devices without (e.g., regular) user interaction like MTC devices, of for automotive or transport or industrial use. The information or communication signaling may be expected and/or received based on the target indication. Presenting and/or operating on information may generally comprise one or more processing steps, in particular decoding and/or executing and/or interpreting and/or transforming information. Operating on information may generally comprise relaying and/or transmitting the information, e.g. on an air interface, which may include mapping the information onto signaling (such mapping may generally pertain to one or more layers, e.g. one or more layers of an air interface, e.g. RLC (Radio Link Control) layer and/or MAC layer and/or physical layer/s). The information may be imprinted (or mapped) on communication signaling based on the target indication, which may make it particularly suitable for use in a RAN (e.g., for a target device like a network node or in particular a UE or terminal).

The tool may generally be adapted for use on a target device, like a UE or terminal. Generally, the tool may provide multiple functionalities, e.g. for providing and/or selecting the target indication, and/or presenting, e.g. video and/or audio, and/or operating on and/or storing received information. Providing a target indication may comprise transmitting or transferring the indication as signaling, and/or carried on signaling, in a RAN, for example if the target device is a UE, or the tool for a UE. It should be noted that such provided information may be transferred to the information system via one or more additionally communication interfaces and/or paths and/or connections. The target indication may be a higher-layer indication and/or the information provided by the information system may be higher-layer information, e.g. application layer or user-layer, in particular above radio layers like transport layer and physical layer. The target indication may be mapped on physical layer radio signaling, e.g. related to or on the user-plane, and/or the information may be mapped on physical layer radio communication signaling, e.g. related to or on the user-plane (in particular, in reverse communication directions). The described approaches allow a target indication to be provided, facilitating information to be provided in a specific format particularly suitable and/or adapted to efficiently use an air interface. A user input may for example represent a selection from a plurality of possible transmission modes or formats, and/or paths, e.g. in terms of data rate and/or packaging and/or size of information to be provided by the information system.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths. For one carrier, more than one numerology may be defined and/or configured. A numerology may be parametrised by a subcarrier spacing and/or a bandwidth and/or a frequency reference. The bandwidth may represent the frequency range of the carrier to be used for the numerology. The frequency reference may identify where on the carrier the bandwidth is located. The frequency reference may correspond to a border frequency of the bandwidth, e.g. low or high frequency border, and/or may represent a center frequency of a subcarrier. The subcarrier may be a reference subcarrier, in particular a border subcarrier. For example, the subcarrier may be the lowest subcarrier (e.g., in frequency and/or number) in a physical resource block of the numerology, e.g. the physical resource block at a start/low end of the bandwidth (in frequency). In some cases, the subcarrier may be the highest subcarrier (in frequency and/or number) of the physical resource block at the end/high end of the bandwidth (in frequency). Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling may be considered one alternative).

A radio node may generally be considered a device or node adapted for wireless and/or radio (and/or microwave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or transmission point (TP) and/or access point (AP) and/or other node, in particular for a RAN as described herein.

The terms wireless device, user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. A radio node, in particular a network node, may in some cases comprise cable circuitry and/or communication circuitry, with which it may be connected or connectable to another radio node and/or a core network.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g. 2D or 3D array, and/or antenna panels. A remote radio head (RRH) may be considered as an example of an antenna array. However, in some variants, a RRH may be also be implemented as a network node, depending on the kind of circuitry and/or functionality implemented therein.

Communication circuitry may comprise radio circuitry and/or cable circuitry. Communication circuitry generally may comprise one or more interfaces, which may be air interface/s and/or cable interface/s and/or optical interface/s, e.g. laser-based.

Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g. controlled by communication circuitry and/or processing circuitry.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on, and/or controlled by the associated circuitry).

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

Contention-based and/or grant-free transmission and/or access may be based on resource/s that are not specifically scheduled or reserved for the transmission or a specific device (or group of devices in some cases), and/or comprise transmission that is not unambiguously associatable, by the receiver, with a transmitter, e.g. based on the resources used for transmission.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes. There may be generally considered a wireless communication network or system, e.g. a RAN or RAN system, comprising at least one radio node, and/or at least one network node and at least one terminal.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of control information or signaling like uplink control information/signaling, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to. A code rate may represent the ratio of the number of information bits before encoding to the number of encoded bits after encoding, considering that encoding adds coding bits for error detection coding and forward error correction. Coded bits may refer to information bits (also called systematic bits) plus coding bits.

Communication signaling may comprise, and/or represent, and/or be implemented as, data signaling, and/or user plane signaling. Communication signaling may be associated to a data channel, e.g. a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel. Data signaling may be signaling associated to and/or on a data channel.

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns representing the information. It may in particular be considered that control signaling as described herein, based on the utilised resource sequence, implicitly indicates the control signaling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A resource pool generally may indicate and/or comprise resources, in particular time-frequency resources, e.g. time and frequency intervals, which may be contiguous or interrupted, and/or code resources. A resource pool may in particular indicate and/or comprise resource elements and/or resource blocks, e.g. PRBs. A radio node like a user equipment may be considered to be configured with a resource pool if it received corresponding control signaling configuring it therewith. Such control signaling may in particular be transmitted by a receiving radio node as described herein. The control signaling may in particular be higher layer signaling, e.g. MAC and/or RRC signaling, and/or may be semi-static or semi-persistent. In some cases, the responding radio node or user equipment may be considered configured with a resource pool, if it is informed about a corresponding configuration, e.g. that it may access resources in the pool for transmitting. Such a configuration in some cases may be predefined, e.g. based on a standard and/or default configuration. A resource pool may be dedicated to one responding radio node or user equipment, or in some cases shared between several. It may be considered that a resource pool may be general, or for specific types of signaling, e.g. control signaling or data signaling. A transmission resource pool may in particular be for control signaling, e.g. uplink control signaling and/or sidelink control signaling, and/or may be dedicated to the user equipment/responding radio node. It may be considered that a resource pool comprises a plurality of resource structures, which may be arranged in subpools or groups, e.g. pertaining and/or according to type of (received or scheduled) signaling or type of response control signaling. Each group or subpool may comprise a number of resource structures, wherein the number may be representable by an indicator and/or bit field of the selection control information. For example, the maximum number of resource structures in a group may correspond to the maximum number of different values representable by the bit field or indicator. Different groups may have different numbers of resource structures. It may generally be considered that a group comprises a smaller number of resource structures than representable by the indicator or bit field. A resource pool may represent a search space and/or space of availability of resources and/or resource structures available for specific signaling. In particular, a transmission resource pool may be considered to represent a (time/frequency and/or code) domain or space of resources available for response control signaling.

Configuring a radio node, in particular a terminal or user equipment, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilise, and/or be adapted to utilise, its circuitry/ies for configuring. Allocation information may be considered a form of configuration data. Configuration data may comprise and/or be represented by configuration information, and/or one or more corresponding indications and/or message/s Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node.

Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

A resource structure may be considered to be neighbored in frequency domain by another resource structure, if they share a common border frequency, e.g. one as an upper frequency border and the other as a lower frequency border. Such a border may for example be represented by the upper end of a bandwidth assigned to a subcarrier n, which also represents the lower end of a bandwidth assigned to a subcarrier n+1. A resource structure may be considered to be neighbored in time domain by another resource structure, if they share a common border time, e.g. one as an upper (or right in the figures) border and the other as a lower (or left in the figures) border. Such a border may for example be represented by the end of the symbol time interval assigned to a symbol n, which also represents the beginning of a symbol time interval assigned to a symbol n+1.

Generally, a resource structure being neighbored by another resource structure in a domain may also be referred to as abutting and/or bordering the other resource structure in the domain.

A resource structure may general represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g. a PUSCH or PUCCH, in particular resource structure smaller than a slot or PRB.

Examples of a resource structure in frequency domain comprise a bandwidth or band, or a bandwidth part. A bandwidth part may be a part of a bandwidth available for a radio node for communicating, e.g. due to circuitry and/or configuration and/or regulations and/or a standard. A bandwidth part may be configured or configurable to a radio node. In some variants, a bandwidth part may be the part of a bandwidth used for communicating, e.g. transmitting and/or receiving, by a radio node. The bandwidth part may be smaller than the bandwidth (which may be a device bandwidth defined by the circuitry/configuration of a device, and/or a system bandwidth, e.g. available for a RAN). It may be considered that a bandwidth part comprises one or more resource blocks or resource block groups, in particular one or more PRBs or PRB groups. A bandwidth part may pertain to, and/or comprise, one or more carriers. A resource pool or region or set may generally comprise one or a plurality (in particular, two or a multiple of two larger than two) of resources or resource structures. A resource or resource structure may comprise one or more resource elements (in particular, two or a multiple of two larger than two), or one or more PRBs or PRB groups (in particular, two or a multiple of two larger than two), which may be continuous in frequency. A Control CHannel Element (CCE) may be considered an example of a resource structure, in particular for control signaling, e.g. DCI or SCI.

A carrier may generally represent a frequency range or band and/or pertain to a central or center frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilising microwave and/or millimeter and/or other frequencies, in particular between 100 MHz or 1 GHz, and 100 GHz or 20 or 10 GHz. Such communication may utilise one or more carriers.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of, or associated to, a symbol. Accordingly, different symbols may have different symbol time lengths. In particular, numerologies with different subcarrier spacings may have different symbol time length. Generally, a symbol time length may be based on, and/or include, a guard time interval or cyclic extension, e.g. prefix or postfix.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g. a LTE-based standard and/or NR. A sidelink may utilise TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilising a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilising the sidelink for communication (respectively, for signaling).

Sidelink transmission and/or transmitting on a sidelink may be considered to comprise transmission utilising the sidelink, e.g. associated resources and/or transmission formats and/or circuitry and/or the air interface. Sidelink reception and/or receiving on a sidelink may be considered to comprise reception utilising the sidelink, e.g. associated resources and/or transmission formats and/or circuitry and/or the air interface. Sidelink control information (e.g., SCI) may generally be considered to comprise control information transmitted utilising a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be send over more than one carrier of an aggregate, e.g. one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A configuration or schedule, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. The transmission/s scheduled may represent signaling to be transmitted by the device for which it is scheduled, or signaling to be received by the device for which it is scheduled, depending on which side of a communication the device is. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission, and/or transmission timing structure like a mini-slot or slot, may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation. It may be considered that the scheduled transmission represents transmission on a physical channel, in particular a shared physical channel, for example a physical uplink shared channel or physical downlink shared channel. For such channels, semi-persistent configuring may be particularly suitable.

Generally, a configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically. In general, a configuration, in particular the feedback configuration and/or a codebook configuration or a set thereof, may be configured based on one or more messages. Such messages may be associated to different layers, and/or there may be at least one message for dynamical configuration and/or at least one message for semi-static configuration. Different messages may configure different or similar or the same parameter/s and/or setting/s; in some cases, dynamic configuration, e.g. with DCI/SCI signaling, may override semi-static configuration, and/or may indicate a selection from a set of configurations, which may e.g. be pre-defined and/or configured with higher layer/semi-static configuration. In particular, a configuration like a feedback configuration may be configured with one or more Radio Resource Control (RRC) messages and/or one or more Medium Access Control (MAC) messages and/or one or more Control Information messages, e.g. Downlink Control Information (DCI) messages and/or Sidelink Control Information (SCI) messages.

A control region of a transmission timing structure may be an interval in time for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time.

The duration of a symbol (symbol time length or interval) of the transmission timing structure may generally be dependent on a numerology and/or carrier, wherein the numerology and/or carrier may be configurable. The numerology may be the numerology to be used for the scheduled transmission.

Scheduling a device, or for a device, and/or related transmission or signaling, may be considered comprising, or being a form of, configuring the device with resources, and/or of indicating to the device resources, e.g. to use for communicating. Scheduling may in particular pertain to a transmission timing structure, or a substructure thereof (e.g., a slot or a mini-slot, which may be considered a substructure of a slot). It may be considered that a border symbol may be identified and/or determined in relation to the transmission timing structure even if for a substructure being scheduled, e.g. if an underlying timing grid is defined based on the transmission timing structure. Signaling indicating scheduling may comprise corresponding scheduling information and/or be considered to represent or contain configuration data indicating the scheduled transmission and/or comprising scheduling information. Such configuration data or signaling may be considered a resource configuration or scheduling configuration. It should be noted that such a configuration (in particular as single message) in some cases may not be complete without other configuration data, e.g. configured with other signaling, e.g. higher layer signaling. In particular, the symbol configuration may be provided in addition to scheduling/resource configuration to identify exactly which symbols are assigned to a scheduled transmission. A scheduling (or resource) configuration may indicate transmission timing structure/s and/or resource amount (e.g., in number of symbols or length in time) for a scheduled transmission.

A scheduled transmission may be transmission scheduled, e.g. by the network or network node. Transmission may in this context may be uplink (UL) or downlink (DL) or sidelink (SL) transmission. A device, e.g. a user equipment, for which the scheduled transmission is scheduled, may accordingly be scheduled to receive (e.g., in DL or SL), or to transmit (e.g. in UL or SL) the scheduled transmission. Scheduling transmission may in particular be considered to comprise configuring a scheduled device with resource/s for this transmission, and/or informing the device that the transmission is intended and/or scheduled for some resources. A transmission may be scheduled to cover a time interval, in particular a successive number of symbols, which may form a continuous interval in time between (and including) a starting symbol and an ending symbols. The starting symbol and the ending symbol of a (e.g., scheduled) transmission may be within the same transmission timing structure, e.g. the same slot. However, in some cases, the ending symbol may be in a later transmission timing structure than the starting symbol, in particular a structure following in time. To a scheduled transmission, a duration may be associated and/or indicated, e.g. in a number of symbols or associated time intervals. In some variants, there may be different transmissions scheduled in the same transmission timing structure. A scheduled transmission may be considered to be associated to a specific channel, e.g. a shared channel like PUSCH or PDSCH.

In the context of this disclosure, there may be distinguished between dynamically scheduled or aperiodic transmission and/or configuration, and semi-static or semi-persistent or periodic transmission and/or configuration. The term "dynamic" or similar terms may generally pertain to configuration/transmission valid and/or scheduled and/or configured for (relatively) short timescales and/or a (e.g., predefined and/or configured and/or limited and/or definite) number of occurrences and/or transmission timing structures, e.g. one or more transmission timing structures like slots or slot aggregations, and/or for one or more (e.g., specific number) of transmission/occurrences. Dynamic configuration may be based on low-level signaling, e.g. control signaling on the physical layer and/or MAC layer, in particular in the form of DCI or SCI. Periodic/semi-static may pertain to longer timescales, e.g. several slots and/or more than one frame, and/or a non-defined number of occurrences, e.g., until a dynamic configuration contradicts, or until a new periodic configuration arrives. A periodic or semi-static configuration may be based on, and/or be configured with, higher-layer signaling, in particular RCL layer signaling and/or RRC signaling and/or MAC signaling.

A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered.

Examples of transmission timing structures include slot, subframe, mini-slot (which also may be considered a substructure of a slot), slot aggregation (which may comprise a plurality of slots and may be considered a superstructure of a slot), respectively their time domain component. A transmission timing structure may generally comprise a plurality of symbols defining the time domain extension (e.g., interval or length or duration) of the transmission timing structure, and arranged neighboring to each other in a numbered sequence. A timing structure (which may also be considered or implemented as synchronisation structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot.

Control information may generally be transmitted in a control message, e.g. on a physical layer or channel, e.g. as a dynamic message like a DCI message or SCI message. A control message may be a command type message, which may comprise, and/or consist of, command type information; or a scheduling type message, which may comprise scheduling information, e.g. scheduling data signaling. Control information may comprise scheduling type control information (or, shorter, scheduling type information), e.g. control information indicating resources and/or transmission parameters for reception of signaling, and/or control information indicating resources and/or transmission parameters for transmission of signaling. The signaling may in particular be data signaling, e.g. on a data channel. Control information may in particular comprise, or consist of, command type control information, and/or be included into a command type message. In general, control information or control message, e.g. DCI or SCI messages, may be distinguished between scheduling type information/messages and command type information/messages. A scheduling type message may schedule transmission on a data channel (data signaling), e.g. for reception or transmission for the target radio node, e.g. in downlink or uplink, respectively. Scheduling grant and scheduling assignment are examples of such scheduling type messages. A command type message may be a message of a different type, e.g., not scheduling transmission on a data channel. A command type message may comprise a set of instructions, which may be configurable or flexible. The instructions may be scheduling-independent. Command type information may for example indicate and/or instruct switching of bandwidth, e.g. to another bandwidth part, and/or activation or deactivation of a carrier and/or cell and/or bandwidth part, and/or activation or deactivation of grant-free transmissions, and/or indications of selection a parameter or configuration out of a set of configured parameters or configurations. In some variants, a command type message may be scheduling independent such that it does not schedule data signaling, or it may have a structure in which such scheduling may be configurable or optional. For the command type, there may be no scheduled transmission based on which reception of the control information may be inferred. It should be noted that scheduling type messages may comprise command type information. Feedback information may be considered a form of control information, in particular UCI or SCI, depending on communication direction or mode. Feedback signaling may be considered a form of control signaling. A control message comprising feedback information may be considered to be of a further type, which may be referred to as feedback type message, which may include a request for resources or in general UCI or UCI-like information in sidelink or backhaul or relay link.

Signaling, in particular control signaling, may comprise a plurality of signals and/or messages, which may be transmitted on different carriers and/or be associated to different acknowledgement signaling processes, e.g. representing and/or pertaining to one or more such processes. An indication may comprise signaling and/or a plurality of signals and/or messages and/or may be comprised therein, which may be transmitted on different carriers and/or be associated to different acknowledgement signaling processes, e.g. representing and/or pertaining to one or more such processes.

It should generally be noted that the number of bits or a bit rate associated to specific signaling that can be carried on a resource element may be based on a modulation and coding scheme (MCS). Thus, bits or a bit rate may be seen as a form of resources representing a resource structure or range in frequency and/or time, e.g. depending on MCS. The MCS may be configured or configurable, e.g. by control signaling, e.g. DCI or MAC (Medium Access Control) or RRC (Radio Resource Control) signaling.

Different formats of for control information may be considered, e.g. different formats for a control channel like a Physical Uplink Control Channel (PUCCH). PUCCH may carry control information or corresponding control signaling, e.g. Uplink Control Information (UCI). UCI may comprise feedback signaling, and/or acknowledgement signaling like HARQ feedback (ACK/NACK), and/or measurement information signaling, e.g. comprising Channel Quality Information (CQI), and/or Scheduling Request (SR) signaling. One of the supported PUCCH formats may be short, and may e.g. occur at the end of a slot interval, and/or multiplexed and/or neighboring to PUSCH. Similar control information may be provided on a sidelink, e.g. as Sidelink Control Information (SCI), in particular on a (physical) sidelink control channel, like a (P)SCCH.

A resource structure in frequency domain (which may be referred to as frequency interval and/or range) may be represented by a subcarrier grouping. A subcarrier grouping may comprise one or more subcarriers, each of which may represent a specific frequency interval, and/or bandwidth. The bandwidth of a subcarrier, the length of the interval in frequency domain, may be determined by the subcarrier spacing and/or numerology. The subcarriers may be arranged such that each subcarrier neighbours at least one other subcarrier of the grouping in frequency space (for grouping sizes larger than 1). The subcarriers of a grouping may be associated to the same carrier, e.g. configurably or configured of predefined. A physical resource block may be considered representative of a grouping (in frequency domain). A subcarrier grouping may be considered to be associated to a specific channel and/or type of signaling, it transmission for such channel or signaling is scheduled and/or transmitted and/or intended and/or configured for at least one, or a plurality, or all subcarriers in the grouping. Such association may be time-dependent, e.g. configured or configurable or predefined, and/or dynamic or semi-static. The association may be different for different devices, e.g. configured or configurable or predefined, and/or dynamic or semi-static. Patterns of subcarrier groupings may be considered, which may comprise one or more subcarrier groupings (which may be associated to same or different signalings/channels), and/or one or more groupings without associated signaling (e.g., as seen from a specific device). An example of a pattern is a comb, for which between pairs of groupings associated to the same signaling/channel there are arranged one or more groupings associated to one or more different channels and/or signaling types, and/or one or more groupings without associated channel/signaling).

Example types of signaling comprise signaling of a specific communication direction, in particular, uplink signaling, downlink signaling, sidelink signaling, as well as reference signaling (e.g., SRS or CRS or CSI-RS), communication signaling, control signaling, and/or signaling associated to a specific channel like PUSCH, PDSCH, PUCCH, PDCCH, PSCCH, PSSCH, etc.).

Operational conditions may pertain to load of the RAN, or application or use case of transmission or signaling, and/or quality of service (QoS) conditions (or requirements) for a transmission or signaling. QoS may for example pertain to data rate and/or priority and/or latency and/or transmission quality, e.g. BLER or BER. Use for URLLC may be considered a quality of service-related condition.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While described variants may pertain to certain Technical Specifications (TSs) of the Third Generation Partnership Project (3GPP), it will be appreciated that the present approaches, concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or a general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise

| Abbreviation | Explanation |
| --- | --- |
| ACK/NACK | Acknowledgment/Negative Acknowledgement |
| ARQ | Automatic Repeat reQuest |
| CAZAC | Constant Amplitude Zero Cross Correlation |
| CBG | Code Block Group |
| CCE | Control Channel Element |
| CDM | Code Division Multiplex |
| CM | Cubic Metric |
| CORESET | Control channel Resource Set |
| CQI | Channel Quality Information |
| CRC | Cyclic Redundancy Check |

| Abbreviation | Explanation |
| --- | --- |
| CRS | Common reference signal |
| CSI | Channel State Information |
| CSI-RS | Channel state information reference signal |
| DAI | Downlink Assignment Indicator |
| DCI | Downlink Control Information |
| DFT | Discrete Fourier Transform |
| DM(-)RS | Demodulation reference signal(ing) |
| FDD/FDM | Frequency Division Duplex/Multiplex |
| HARQ | Hybrid Automatic Repeat Request |
| IFFT | Inverse Fast Fourier Transform |
| MBB | Mobile Broadband |
| MCS | Modulation and Coding Scheme |
| MIMO | Multiple-input-multiple-output |
| MRC | Maximum-ratio combining |
| MRT | Maximum-ratio transmission |
| MU-MIMO | Multiuser multiple-input-multiple-output |
| OFDM/A | Orthogonal Frequency Division Multiplex/Multiple Access |
| PAPR | Peak to Average Power Ratio |
| PBCH | Physical Broadcast CHannel |
| PDCCH | Physical Downlink Control CHannel |
| PDSCH | Physical Downlink Shared CHannel |
| PRACH | Physical Random Access CHannel |
| PRB | Physical Resource Block |
| PUCCH | Physical Uplink Control CHannel |
| PUSCH | Physical Uplink Shared CHannel |
| (P)SCCH | (Physical) Sidelink Control CHannel |
| (P)SSCH | (Physical) Sidelink Shared CHannel |
| QoS | Quality of Service |
| RB | Resource Block |
| RNTI | Radio Network Temporary Identifier |
| RRC | Radio Resource Control |
| SC-FDM/A | Single Carrier Frequency Division Multiplex/Multiple Access |
| SCI | Sidelink Control Information |
| SINR | Signal-to-interference-plus-noise ratio |
| SIR | Signal-to-interference ratio |
| SNR | Signal-to-noise-ratio |
| SR | Scheduling Request |
| SRS | Sounding Reference Signal(ing) |
| SVD | Singular-value decomposition |
| TDD/TDM | Time Division Duplex/Multiplex |
| UCI | Uplink Control Information |
| UE | User Equipment |
| URLLC | Ultra Low Latency High Reliability Communication |
| VL-MIMO | Very-large multiple-input-multiple-output |
| ZF | Zero Forcing |

Abbreviations may be considered to follow 3GPP usage if applicable.

The invention claimed is:

1. A method of operating a network node in a radio access network, the method comprising:
   transmitting first numerology information indicating a first numerology for a carrier, the first numerology having a first subcarrier spacing and a first frequency reference; and
   transmitting a frequency shift indication indicating a second frequency reference for a second numerology for the same carrier, the frequency shift indication indicating the second frequency reference in relation to the first frequency reference;
   and at least one of:
      the first frequency reference pertains to a first subcarrier in a first physical resource block, the first subcarrier having the lowest frequency of the subcarriers in the first physical resource block; and
      the second frequency reference pertains to a second subcarrier in a second physical resource block, the second subcarrier having the lowest frequency of the subcarriers in the second physical resource block.

2. The method according to claim 1, wherein the first and second numerology have different subcarrier spacings.

3. The method according to claim 1, wherein the frequency shift indication indicates a shift in frequency between:
   at least one of a physical resource block and a subcarrier according to the second numerology; and
   at least one of a physical resource block and a subcarrier according to the first numerology.

4. The method according to claim 1, wherein the frequency shift indication is represented by a bit field of one of 1, 2 and 3 bits.

5. The method according to claim 1, wherein at least one of:
   the frequency shift indication indicates a shift of the second frequency reference to higher frequencies if the second numerology has a larger subcarrier spacing than the first numerology; and
   the frequency shift indication indicates a shift of the second frequency reference to lower frequencies if the second numerology has a smaller subcarrier spacing than the first numerology.

6. The method according to claim 1, wherein the frequency shift indication is interpreted to indicate one of a positive and a negative shift between the first frequency reference and the second frequency reference based on a difference between the first subcarrier spacing and the second subcarrier spacing of the second numerology.

7. The method according to claim 1, wherein the frequency shift indication indicates at least one of:
   a shift in units pertaining to the smaller of the subcarrier spacings; and
   a shift in units pertaining to the smallest subcarrier spacing defined for one of a frequency band, a frequency region and a carrier.

8. The method according to claim 1, wherein the frequency shift indication is transmitted separately from first numerology information.

9. The method according to claim 1, wherein the frequency shift indication indicates a plurality of shifts between frequency references associated to different subcarrier spacings, each shift pertaining to neighbouring subcarrier spacings.

10. A network node in a radio access network, the network node configured to:
    transmit first numerology information indicating a first numerology for a carrier, the first numerology having a first subcarrier spacing and a first frequency reference; and
    transmit a frequency shift indication indicating a second frequency reference for a second numerology for the same carrier, the frequency shift indication indicating the second frequency reference in relation to the first frequency reference;
    and at least one of:
       the first frequency reference pertains to a first subcarrier in a first physical resource block, the first subcarrier having the lowest frequency of the subcarriers in the first physical resource block; and
       the second frequency reference pertains to a second subcarrier in a second physical resource block, the second subcarrier having the lowest frequency of the subcarriers in the second physical resource block.

11. A method of operating a user equipment in a radio access network, the method comprising:
    determining a first subcarrier spacing and a first frequency reference for a first numerology for a carrier based on numerology information; and determining a second frequency reference for a second numerology for the same carrier based on a received frequency shift indication, the frequency shift indication indicating the second frequency reference in relation to the first frequency reference;

and at least one of:
- the first frequency reference pertains to a first subcarrier in a first physical resource block, the first subcarrier having the lowest frequency of the subcarriers in the first physical resource block; and
- the second frequency reference pertains to a second subcarrier in a second physical resource block, the second subcarrier having the lowest frequency of the subcarriers in the second physical resource block.

12. The method according to claim 11, wherein the first and second numerology have different subcarrier spacings.

13. The method according to claim 11, wherein the frequency shift indication indicates a shift in frequency between:
- at least one of a physical resource block and a subcarrier according to the second numerology; and
- at least one of a physical resource block and a subcarrier according to the first numerology.

14. The method according to claim 11, wherein the frequency shift indication is represented by a bit field of one of 1, 2 and 3 bits.

15. The method according to claim 11, wherein at least one of:
- the frequency shift indication indicates a shift of the second frequency reference to higher frequencies if the second numerology has a larger subcarrier spacing than the first numerology; and
- the frequency shift indication indicates a shift of the second frequency reference to lower frequencies if the second numerology has a smaller subcarrier spacing than the first numerology.

16. The method according to claim 11, wherein the frequency shift indication is interpreted to indicate one of a positive and a negative shift between the first frequency reference and the second frequency reference based on a difference between the first subcarrier spacing and the second subcarrier spacing of the second numerology.

17. A user equipment for a radio access network, the user equipment configured to:
- determine a first subcarrier spacing and a first frequency reference for a first numerology for a carrier based on numerology information and
- determine a second frequency reference for a second numerology for the same carrier based on a received frequency shift indication, the frequency shift indication indicating the second frequency reference in relation to the first frequency reference;

and at least one of:
- the first frequency reference pertains to a first subcarrier in a first physical resource block, the first subcarrier having the lowest frequency of the subcarriers in the first physical resource block; and
- the second frequency reference pertains to a second subcarrier in a second physical resource block, the second subcarrier having the lowest frequency of the subcarriers in the second physical resource block.

18. A non-transitory computer storage medium storing a computer program comprising instructions that, when executed, cause processing circuitry to at least one of control and perform a method of operating a network node in a radio access network, the method comprising:
- transmitting first numerology information indicating a first numerology for a carrier, the first numerology having a first subcarrier spacing and a first frequency reference; and
- transmitting a frequency shift indication indicating a second frequency reference for a second numerology for the same carrier, the frequency shift indication indicating the second frequency reference in relation to the first frequency reference;

and at least one of:
- the first frequency reference pertains to a first subcarrier in a first physical resource block, the first subcarrier having the lowest frequency of the subcarriers in the first physical resource block; and
- the second frequency reference pertains to a second subcarrier in a second physical resource block, the second subcarrier having the lowest frequency of the subcarriers in the second physical resource block.

* * * * *